United States Patent [19]
Huggins et al.

[11] Patent Number: 6,004,083
[45] Date of Patent: Dec. 21, 1999

[54] SYSTEM FOR MOUNTING A CHUCK DEVICE TO A ROTARY POWER TOOL

[75] Inventors: Mark S. Huggins; Andrew McLeland, both of Clemson, S.C.

[73] Assignee: Power Tool Holders Incorporated, Wilmington, Del.

[21] Appl. No.: 09/065,861

[22] Filed: Apr. 24, 1998

[51] Int. Cl.$^6$ .................................. B25F 5/00; B23C 5/26
[52] U.S. Cl. ........................ 409/232; 279/43.2; 279/99; 285/390; 403/343
[58] Field of Search .................................. 279/7, 99, 42, 279/43, 43.1, 43.2, 43.4; 409/232, 234; 403/343; 285/390

[56] References Cited

U.S. PATENT DOCUMENTS

| | | | |
|---|---|---|---|
| 169,324 | 10/1875 | Williams | 279/99 |
| 2,917,975 | 12/1959 | Webster | 409/234 |
| 3,489,191 | 1/1970 | Blevins | 279/99 |
| 4,548,431 | 10/1985 | Hall et al. | 285/390 |

*Primary Examiner*—Steven C. Bishop
*Attorney, Agent, or Firm*—Dority & Manning

[57] ABSTRACT

A power rotary tool has a drive spindle and a chuck device mounted on the end of the spindle. The chuck device has a body member with an axial bore through an end thereof that defines a female pilot section and a threaded longitudinal section adjacent and rearward of the female pilot section. A flat shoulder is defined on the body member rearward of the threaded longitudinal section. The drive spindle has a male pilot section at a forward end thereof and a threaded longitudinal section adjacent and rearward of the male pilot section. A radial stop is defined on the drive spindle adjacent and rearward of the threaded section. Upon mounting of the chuck onto the drive spindle, the male pilot longitudinal section slides tightly within and uniformly contacts the female pilot longitudinal section and the shoulder of the body member abuts directly against the radially extending stop defined on the drive spindle.

10 Claims, 5 Drawing Sheets

SYSTEM FOR MOUNTING A CHUCK DEVICE TO A ROTARY POWER TOOL

BACKGROUND OF THE INVENTION

A wide variety of attaching systems and methods are known in the industry for mounting chucks to drive spindles of power rotary tools. For example, threaded connections, tapered bore systems, coupling devices, etc., are well known and used in various applications. An essential feature of each mounting system is, however, that it securely mounts the chuck to the drive spindle so that the chuck is precisely aligned axially with the drive spindle rotational axis and is not allowed to move radially relative to the spindle so as to minimize run-out in operation of the power tool. The chuck must be secured to the drive spindle in the axial and radial direction to ensure proper operation of the rotary tool and tool bit.

With conventional threaded mounting systems, the interengaging threads between the chuck body and drive spindle are primarily responsible for securing the chuck device in the radial and axial direction. However, due to the machining tolerances in defining the threads, a certain amount of "play" always exists between the threads. This "play" can contribute to imprecise rotary operations, particularly in high speed and high precision applications such as routing. Additionally, operational stresses are absorbed by the threads between the drive spindle and chuck body, which may lead to binding of the chuck on the drive spindle, or other distortion of the threads.

The present invention relates to an improved system for mounting a chuck device to a drive spindle wherein the convenience and speed of a threaded coupling system is utilized without the drawbacks noted above.

OBJECTS AND SUMMARY OF THE INVENTION

A principal object of the present invention is to provide an improved mounting system for mounting a chuck device to a drive spindle of a rotary tool.

And still a further object of the present invention is to provide a mounting system between a chuck device and drive spindle of a rotary tool wherein precise axial and radial alignment is provided which is not dependent upon threaded engagement between the drive spindle and chuck body.

Additional objects and advantages of the present invention will be set forth in part in the following description, or may be obvious from the description, or may be learned through practice of the invention.

In accordance with the objects and purposes of the invention, a power rotary tool is provided having a rotatable drive spindle and a chuck device mounted on an end of the drive spindle for holding a tool bit to the drive spindle. The chuck device includes a body member with an end thereof configured for attachment on the drive spindle. This end has an axial bore therethrough defining a forward female pilot longitudinal section and a threaded longitudinal section adjacent and rearward of the female pilot section. The female pilot section is preferably a smooth wall circular cross-sectional longitudinal section.

A flat shoulder is defined on the body member rearward of the threaded longitudinal section. Preferably, the flat shoulder defines the extreme end of the body member, but may be defined by another structural component of the body member. The flat shoulder is preferably defined in a plane that is perpendicular to the longitudinal axis of the body member or the drive spindle.

The drive spindle has a male pilot longitudinal section at a forward end thereof. This male pilot section has a length and diameter generally equal to that of the female pilot longitudinal section of the body member. A threaded longitudinal section is adjacent and rearward of the male pilot longitudinal section. A radially extending stop or shoulder is defined on the drive spindle adjacent and rearward of the threaded section. In a preferred embodiment of the invention, the stop may be defined by a bearing that is mounted on the drive spindle immediately adjacent to the threaded section.

Thus, upon threaded mounting of the chuck device on the drive spindle, the male pilot longitudinal section of the drive spindle slides tightly within and uniformly contacts the female pilot longitudinal section of the body member. The shoulder of the body member abuts directly against the radially extending stop defined on the drive spindle when the threaded longitudinal sections of the drive spindle and the body member are in threaded engagement. Accordingly, the axial forces between the chuck and drive spindle are absorbed by the shoulder and radially extending stop. The radial forces and radial alignment between the chuck and drive spindle are accounted for by the interengaging male and female pilot sections. Thus, the threads are relieved of operational stresses in the axial and radial direction and the chuck device is precisely aligned in the axial and radial directions by the pilot sections and shoulder/radial stop.

In a preferred embodiment, the male and female pilot longitudinal sections have a diameter slightly less than that of the threaded sections to ensure that the radial stresses and radial alignment are accounted for by the pilot members.

Preferably, the pilot longitudinal sections have a longitudinal length of at least one-third, and more preferably about one-half, of that of the threaded sections.

It is important to the invention that the female and male pilot longitudinal sections have matching diameters within very precise tolerances so that radial alignment between the chuck and spindle is as precise as possible. In this regard, the diameter should match within a tolerance range of about 0.0004 inches. Thus, the male pilot section of the drive spindle can slide tightly within the female pilot section of the body member with significantly less "play" than that which is necessitated between the threads of the two devices.

In an alternative embodiment of the invention, the male and female pilot sections can be reversed between the drive spindle and the body member. In other words, the female pilot section can be defined in the drive spindle and the male pilot section can be defined on the chuck body member.

It should be appreciated by those skilled in the art that the present inventive mounting system is not limited to any particular type of rotary power tool or chuck device. The present invention is useful in any application wherein a chuck device must be mounted onto a drive spindle of a power tool. The present invention is not limited to any particular embodiment or application of chuck or power tool.

Preferred embodiments of the invention will be discussed in greater detail below with reference to the attached drawings.

DETAILED DESCRIPTION OF THE PREFERRED EMBODIMENTS

Figure 1:
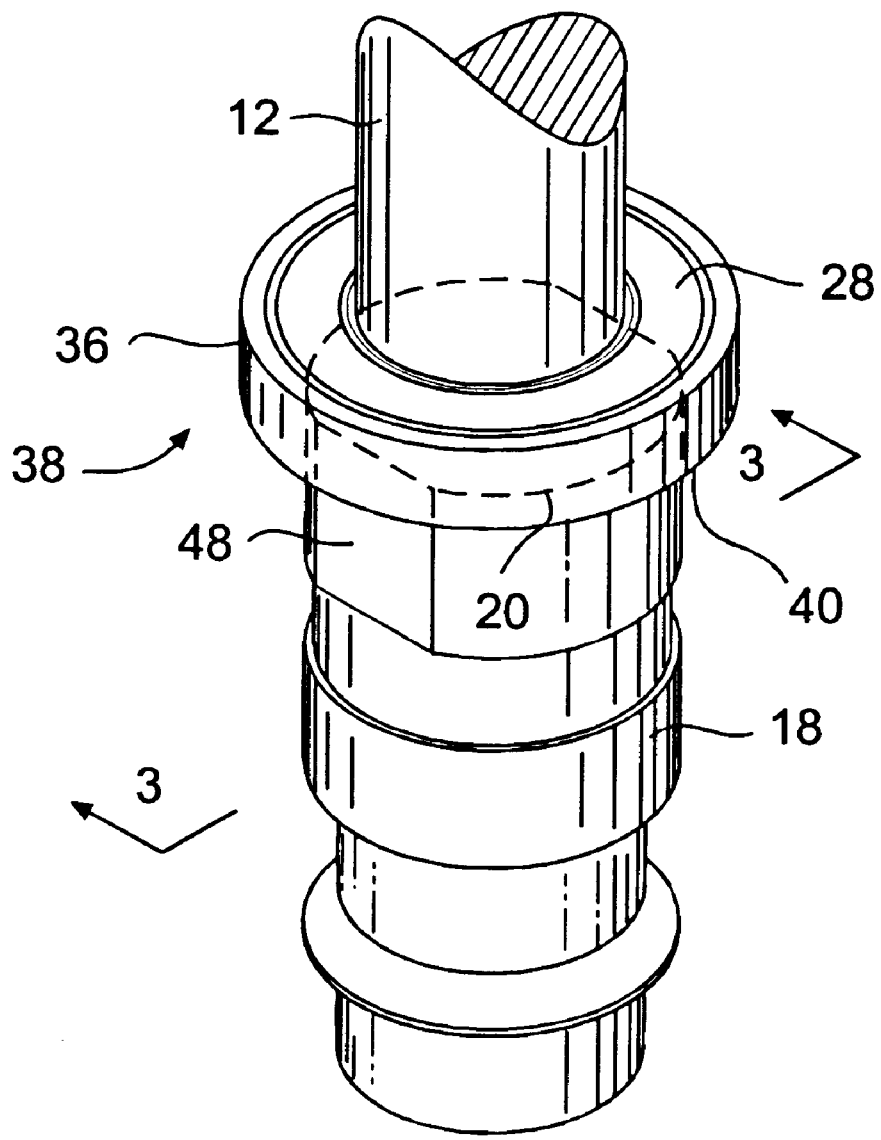
FIG. 1 is a perspective view of the drive spindle of the rotary tool attached to the body member of a chuck device according to the invention.

Reference will now be made in detail to the presently preferred embodiments of the invention, one or more examples of which are illustrated in the drawings. Each example is provided by way of explanation of the invention, and is not meant as a limitation of the invention. For example, features illustrated or described as part of one embodiment can be used in another embodiment to yield still a third embodiment. It is intended that the present invention cover such modifications and variations as come within the scope and spirit of the present invention.

Figure 1A:
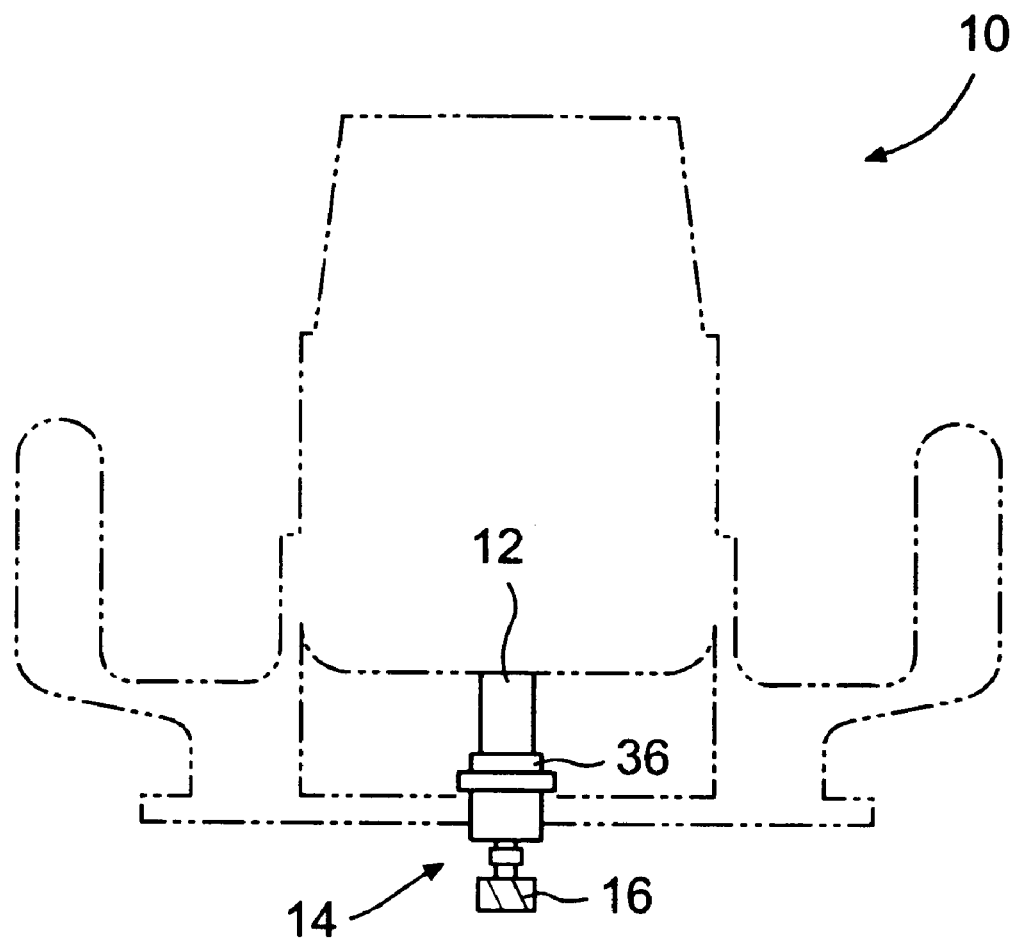
FIG. 1A is a partial diagrammatic representation of a power rotary tool, such as the router, incorporating the present inventive mounting system.
Figure 2:
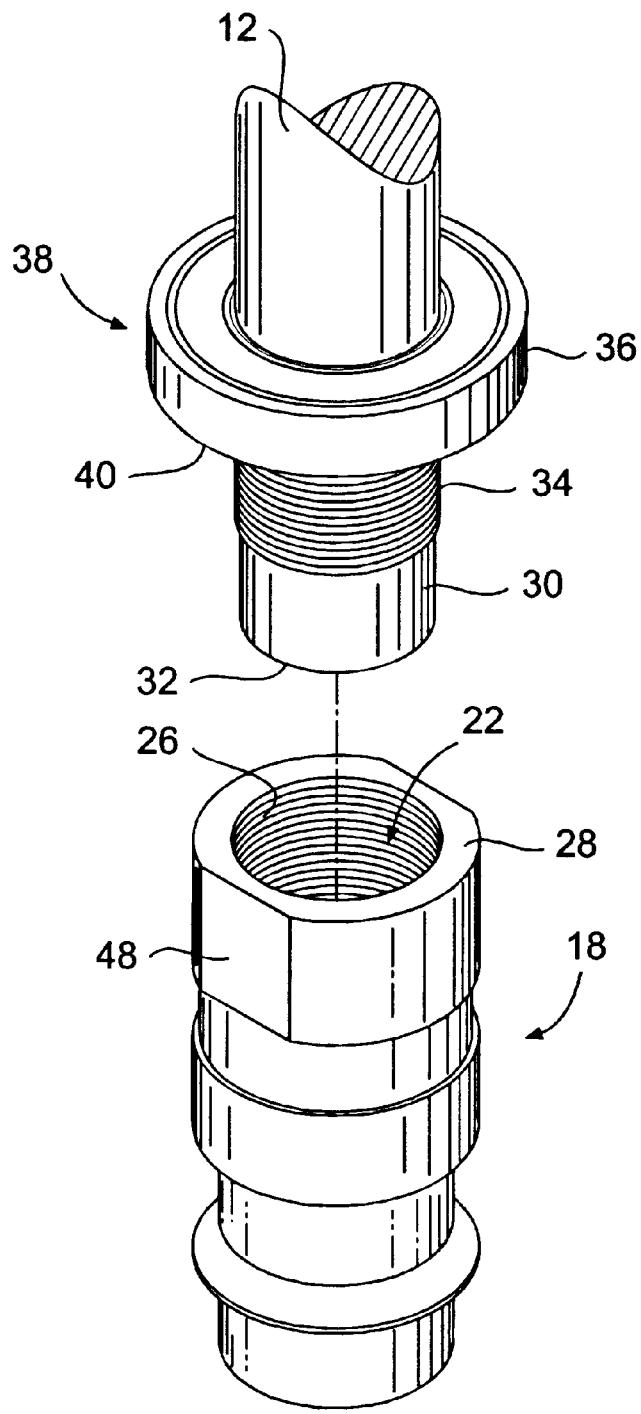
FIG. 2 is an in-line component view particularly illustrating the mounting mechanism between the drive spindle and body member.

Referring to FIG. 1A in general, the present invention relates to an inventive mounting system for mounting a chuck device, generally 14, to a drive spindle 12 of a rotary power tool 10. It should be appreciated that the invention is not limited to any particular type of chuck device 14 or power rotary tool 10. For example, power tool 10 illustrated in FIG. 1A is a conventional router and chuck device 14 is a chuck configured for holding a routing bit 16 relative to drive spindle 12. The present inventive mounting system is just as applicable for any other types of rotary power tools, such as drills, lathes, presses, laminate trimmers, dry wall cutters, etc.

It should also be appreciated by those skilled in the art that chuck device 14 can encompass any manner of chuck wherein a body member 18 is mounted onto a drive spindle. In this regard, it is not necessary for purposes of the present description to describe in detail any particular type of chuck. The present description refers only to those portions of the chuck 14, particularly the body member 18, necessary for an understanding of the invention. The chuck body illustrated in the drawings relates to a particular type of chuck from the present assignee, Power Tool Holders Incorporated, designed for routing applications in particular. This chuck is described in detail in co-pending U.S. patent application Ser. No. 08/922,411 filed on Sep. 3, 1997, now abandoned the entire description and disclosure of which is incorporated herein by reference for all purposes. However, it should be appreciated, that the chuck described in the co-pending '411 application is but one example of any suitable chuck device.

Referring to FIGS. 1 through 4 in general, the power rotary tool 10 includes a drive spindle 12 and a chuck device 14 mounted onto an end 32 of spindle 12 for holding a tool bit 16 to spindle 12 the chuck device 14 has a body member, generally 18, with an end 20 configured for attachment onto drive spindle 12. End 20 has an axial bore 22 defined therein. Axial bore 22 defines a forward female pilot section 24. This female pilot section 24 is preferably defined by a smooth-walled circular longitudinal section of body member 18. A threaded longitudinal section 26 is defined in bore 22 rearward of female pilot section 24.

In the embodiment illustrated, body member 18 is from a type of chuck device 14 incorporating a number of longitudinally extending gripping segments 44 separated by axial slits 46. Segments 44 are compressed radially inward by an operating mechanism (not shown) in order to grip upon a tool shank inserted into axial bore 17 defined through the front of body member 18. As discussed above, the operation of the chuck device is not necessary for an understanding of the present invention, and any conventional type of chuck can be utilized in this regard. For example, keyless or keyed chucks for use with power rotary drills utilize a body member having angled passages defined therethrough for receipt of jaw members. These jaw members are in threaded engagement with a rotatable ring that is turned by a sleeve member or key device. This type of chuck device is also within the scope and spirit of this invention, as well as any other conventional chuck.

A flat shoulder, generally 28, is defined on body member 18 rearward of threaded longitudinal section 26. In a preferred embodiment, shoulder 28 is defined by the extreme end surface of body member 18. In alternative embodiments, however, flat shoulder 28 can be defined by any structural component of body member 18. Preferably, shoulder 18 is machined as close as possible to be perpendicular with the longitudinal axis of body member 18 and spindle 12. It is preferred that the perpendicularity of shoulder 28 be held to a value of about 0.0005 inches so that the chuck will be precisely square with respect to spindle 12 of rotary power tool 10, as explained in greater detail below.

The mounting system according to the invention also includes a male pilot section 30 defined on a forward end 32 of spindle 12. Male pilot section 30 preferably is defined by a longitudinally extending circular cross-sectional member having a diameter 33 that is matched as close as possible to diameter 31 of female pilot section 24. In operation of the mounting system, the male pilot section 30 slides tightly within female pilot section 24 to maintain the chuck body 18 in precise axial and radial alignment with drive spindle 12. In this regard, the machining tolerances between the diameters 31 and 33 is held to a very precise range of within 0.0004 inches. Thus, there is substantially no "play" between the male pilot section 30 and the walls of the female pilot section 24. Thus, run-out or any radial misalignment between body 18 and drive spindle 12 is minimized.

Drive spindle 12 also includes a threaded longitudinal section 34 adjacent to and rearward of the male pilot longitudinal section 30. Threaded section 34 has threads that engage with threaded section 26 defined in body member 18.

A radially extending stop, generally 38, is defined on drive spindle 12 adjacent to and rearward of threaded section 34. Stop 38 can be defined by any surface on spindle 12 that extends radially outward from the spindle and defines a face or shoulder that is essentially perpendicular to the axis of spindle 12. In a preferred embodiment illustrated in the figures, stop 38 is defined by a bearing ring or device 36 mounted onto shaft 12. Bearing device 36 defines a flat perpendicular face 40 that is oppositely facing to flat shoulder 28 defined on the end of body member 18.

In operation of the mounting system, the male and female pilot longitudinal sections 24, 30 provide very precise radial alignment of the body member 18 and spindle 12. Additionally, the pilot longitudinal sections 24, 30 absorb any radial stresses generated during operation of the power tool and thus aid in maintaining thread integrity of the threaded sections. Accordingly, the male and female pilot longitudinal sections have a diameter 33, 31 that is slightly less than that of the threaded longitudinal sections 26, 34.

Preferably, the male and female pilot longitudinal sections 24, 30 have a longitudinal length that is at least one-third, and preferably around one-half, of that of the threaded sections 26, 34.

Figure 3:
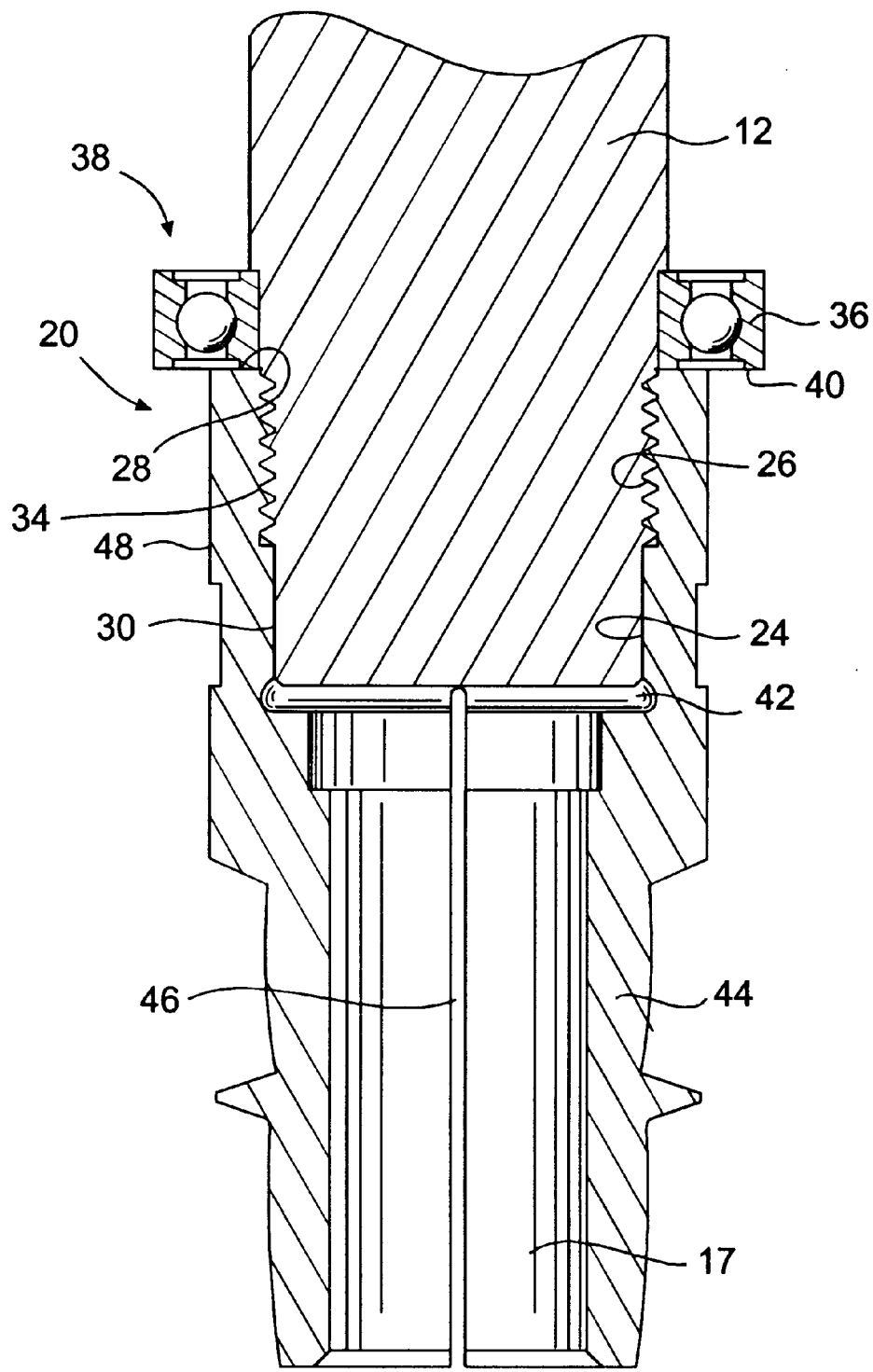
FIG. 3 is a cross-sectional view taken along the lines indicated in FIG. 1.
Figure 4:
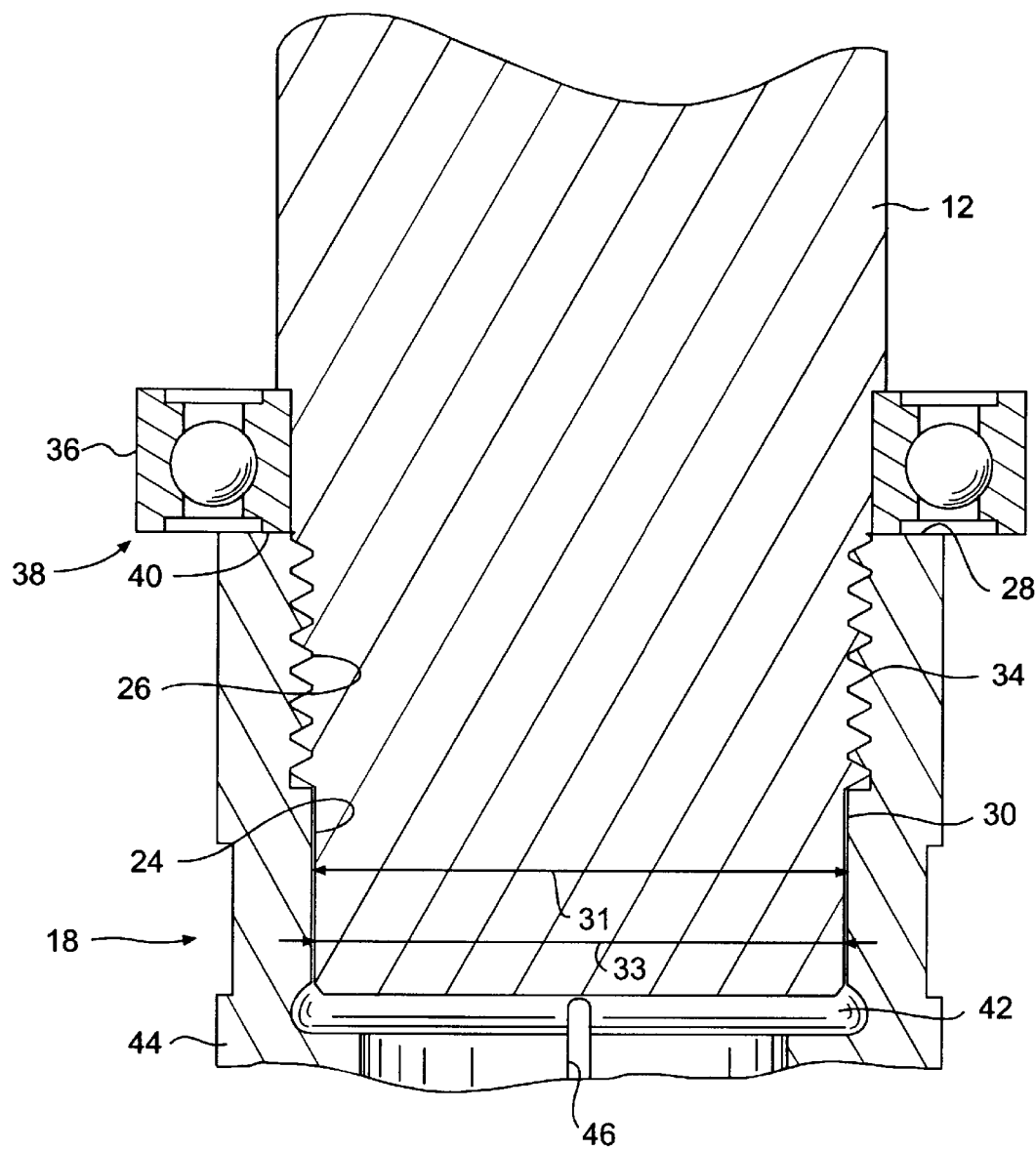
FIG. 4 is an enlarged cross-sectional view of the embodiment illustrated in FIG. 3.

Referring to FIGS. 3 and 4 in particular, a circumferential groove 42 may be defined in the forward most end of bore 22 directly adjacent to female pilot section 24. This circumferential groove 42 ensures that spindle 12 does not bottom out against any surface of body member 18 and that axial alignment is maintained by the contacting surfaces of stop 38 and shoulder 28. Also, in the embodiment of body member 18 illustrated in the figures, circumferential groove 42 ensures that gripping segments 44 flex generally at groove 42 when compressed radially inward to grip upon a tool shank.

To mounts body member 18 onto spindle 12, an operator simply threads body member 18 onto end 32 of spindle 12. As the threads engage, male pilot section 30 will slide within female pilot section 24. Threaded engagement between the members will continue until shoulder 28 of body member 18 abuts against stop 38 of spindle 12. Flat sections 48 may be defined on body member 18 so that a wrench or other tightening device may be utilized to tighten body member 18 onto spindle 12.

It should be appreciated by those skilled in the art that various modifications and variations can be made in the present invention without departing from the scope or spirit of the invention. For example, the male and female pilot sections can have any longitudinal length. Also, body member 18 may be that of any conventional type of chuck.

It should also be appreciated that a reversal of parts is contemplated within the scope and spirit of the invention. For example, a bore may actually be defined in the end of the drive spindle wherein the drive spindle defines the female pilot section and adjacent threaded inner diameter. In this embodiment, the male pilot section and male threaded longitudinal section may be defined on the end of the body member. It is intended that the present invention cover such modifications and variations as come within the scope of the appended claims and their equivalents.

What is claimed is:

1. A power rotary tool having a rotatable drive spindle and a chuck device mounted on an end of said drive spindle for holding a tool bit to said drive spindle, comprising:

said chuck device having a body member with an end thereof configured for attachment on said drive spindle, said end having an axial bore therethrough defining a forward female pilot longitudinal section and a threaded longitudinal section adjacent and rearward of said female pilot section;

a flat shoulder defined on said body member rearward of said threaded longitudinal section at an extreme end of said body member;

said drive spindle having male pilot longitudinal section at a forward end thereof with a length and diameter generally equal to that of said female pilot longitudinal section of said body member, and a threaded longitudinal section adjacent and rearward of said male pilot longitudinal section;

a radially extending stop defined on said drive spindle adjacent and rearward of said threaded section; and wherein upon threaded mounting of said chuck device on said drive spindle, said male pilot longitudinal section of said drive spindle slides tightly within and uniformly contacts said female pilot longitudinal section of said body member and said shoulder of said body member abuts directly against said radially extending stop defined on said drive spindle when said threaded longitudinal sections of said drive spindle and said body member are in threaded engagement.

2. The power rotary tool as in claim 1, wherein said male and female pilot longitudinal sections have a diameter slightly less than that of said threaded sections.

3. The power rotary tool as in claim 1, wherein said male and female pilot longitudinal sections have a longitudinal length of at least one-third of that of said threaded sections.

4. The power rotary tool as in claim 1, wherein said drive spindle comprises a bearing device mounted thereon directly adjacent said threaded section, said bearing device defining said radially extending stop.

5. The power rotary tool as in claim 1, further comprising a circumferential groove defined in said body member forward of and adjacent said female pilot longitudinal section.

6. The power rotary tool as in claim 1, wherein said male and female pilot longitudinal sections have matching diameters within a tolerance of about 0.0004 inches.

7. The power rotary tool as in claim 1, wherein said power tool is a router and said chuck device is a chuck configured for holding routing bits.

8. The power rotary tool as in claim 1, wherein said male and female pilot longitudinal sections comprise smooth walled circular cross section sections.

9. A power rotary tool having a rotatable drive spindle and a chuck device mounted on an end of said drive spindle for holding a tool bit to said drive spindle, comprising:

said chuck device having a body member with an end thereof configured for attachment on said drive spindle, said end having an axial bore therethrough defining a forward female pilot longitudinal section and a threaded longitudinal section adjacent and rearward of female pilot section;

a flat shoulder defined on an extreme end of said body member;

said drive spindle having a forward end defining a pilot male longitudinal section with a length and circumference generally equal to that of said pilot female longitudinal section of said body member, and a threaded longitudinal section adjacent and rearward of said male pilot longitudinal section;

a radially extending bearing member disposed on said drive spindle adjacent said threaded section thereof, said bearing member defining a stop surface on said drive spindle adjacent and rearward of said threaded section;

said female and male pilot longitudinal sections having matching diameters within a tolerance of about 0.0004 inches, said matching diameters being slightly less than that of said threaded sections; and wherein upon threaded mounting of said chuck device on said drive spindle, said male pilot longitudinal section of said drive spindle slides tightly within and uniformly contacts said female pilot longitudinal section of said body member and said shoulder of said body member abuts directly against said radially extending stop defined on said drive spindle when said threaded longitudinal sections of said drive spindle and said body member are in threaded engagement.

10. The power rotary tool as in claim 9, wherein said power tool is a router and said chuck device is a chuck configured for holding routing bits.

* * * * *